United States Patent Office 3,592,893
Patented July 13, 1971

3,592,893
NITRO ALCOHOLS IN SYNERGISTIC
ANTIMICROBIC COMPOSITIONS
Heinz Gunter Nosler, Monheim, Rhineland, Richard Wessendorf, Hilden, Rhineland, and Horst Bellinger, Dusseldorf, Germany, assignors to Henkel & Cie, GmbH, Dusseldorf, Germany
No Drawing. Filed Mar. 1, 1968, Ser. No. 709,834
Claims priority, application Germany, Apr. 26, 1967, H 62,546
Int. Cl. A01n 9/20, 9/24
U.S. Cl. 424—329    7 Claims

ABSTRACT OF THE DISCLOSURE

Synergistic antimicrobic compositions comprised of an aliphatic alcohol having 2 to 5 carbon atoms in a straight chain and having at least one nitro group and 1 to 4 hydroxy groups and a compound selected from the group consisting of a phenolic antimicrobic compound and a cationic quaternary ammonium compound having at least one hydrophobic chain of 8 to 18 carbon atoms.

PRIOR ART

Phenolic and quaternary ammonium compounds having a hydrophobic radical have found wide spread use in all kinds of antimicrobic preparations because of their good disinfectant activity. However, despite many favorable properties, these compounds possess certain disadvantages which prevent their use at high enough concentration for 100 percent antimicrobic activity which include unpleasant odor, discoloration of compositions containing them, poor skin tolerance, etc. Therefore, it is often necessary to reduce the bactericide concentration which reduces the effectiveness of the antimicrobic agent. In many cases, the bactericide activity is lessened by the influence of other ingredients in the antimicrobic compositions which would require higher concentrations to obtain satisfactory effects with these compounds. The concentrations of those antimicrobic additives cannot be increased without additional side effects.

OBJECTS OF THE INVENTION

It is an object of the invention to provide novel synergistic antimicrobic compositions having a high degree of activity without disadvantages.

It is a further object of the invention to provide a novel method of killing fungi and bacteria.

These and other objects and advantages of the invention will become obvious from the following detailed description.

THE INVENTION

The synergistic antimicrobic compositions of the invention are comprised of an antimicrobic compound selected from the group consisting of a phenolic compound and a quaternary ammonium compound having at least one hydrophobic radical of 8 to 18 carbon atoms and at least one straight chain aliphatic alcohol of 2 to 5 carbon atoms having at least one nitro group and which may be substituted with a radical selected from the group consisting of halogen, lower alkyl, hydroxy lower alkyl, phenyl, halophenyl and nitrophenyl, the weight ratio of antimicrobic compound to alcohol being 100:1 to 1:50.

The nitro alcohols of the compositions of the invention may be any of the known nitro alcohols having bactericidal and fungicidal activity and may have 1 to 4 hydroxy groups. The nitro alcohols substituted with chlorine and/or bromine have an exceptionally high degree of effectiveness in the compositions giving effective bactericidal and fungicidal activity at very low concentrations.

Examples of suitable nitro alcohols for the invention are 2-nitro-ethanol-(1),
2-bromo-2-nitro-ethanol-(1),
2-nitro-propanediol-(1,3),
2-ethyl-2-nitro-propanediol-(1,3),
2-hydroxy-methyl-2-nitropropanediol-(1,3),
2-bromo-2-nitro-propanol-(1),
1-nitro-3,3,3-trichloropropanol-(2),
2-bromo-2-nitro-propanediol-(1,3),
2-chloro-2-nitro-propanediol-(1,3),
1-bromo-1-nitro-3,3,3-trichloropropanol-(2),
2-bromo-2-nitro-1-phenyl propanediol-(1,3),
2-bromo-2-nitro-1-(p-nitrophenyl)-propanediol-(1,3),
2-bromo-2-nitro-(o-chlorophenyl)-propanediol-(1,3),
2-bromo-2-nitro-butanol-(1),
3-bromo-3-nitro-butanol-(2),
3-nitro-1,1,1-trichloro-pentanol-(2).

Particularly preferred is 1-bromo-1-nitro-3,3,3-trichloropropanol-(2).

The phenolic type of bactericides are well known and may be phenols having 1 to 4 aromatic rings and substituted with halogen, alkyl, carboxylic acid groups, nitro, phenyl and/or phenyl alkyl and the like. Examples of suitable phenolic compounds are phenol, cresol, xylenol, p-chlorophenol, o-chlorophenol, p-bromophenol, p-chloro-m-cresol, 3,5-dimethyl-p-chlorophenol, o-benzyl-p-chlorophenol, 2,4,6-trichlorophenol, pentachlorophenol, sodium-pentachlorophenolate, sodium-o-phenyl-phenolate, resorcinol, methylresorcinol, phenylresorcinol, benzylresorcinol, p-chlorobenzylresorcinol, 4-n-octylpyrogallol, benzylpyrogallol, 2,2'-methylene - bis - (4-chlorophenol), 2,2'-methylene - bis - (3,4,6-trichlorophenol), 2,2'-methylene-bis-(4 - chloro-3,5-xylenol), o-hydroxy-benzoic acid, m-hydroxy benzoic acid, propyl-p-hydroxybenzoate, dibromo-, dichloro-, trichloro- and tribromosalicylanilide, trifluoromethyl halogensalicylanilide, m-nitrophenol, p-nitrophenol, o-nitrophenol, 2,5-dinitrophenol, 2,4,6-trinitrophenol, 3-nitro-4-hydroxybenzoic acid, p-aminophenol, 2,4-diaminophenol, bis-(p-hydroxyphenyl)-methylene, 2,2'-dihydroxy, 3,5,6,3',5',6'-hexachlorodiphenylmethane, α-naphthol, β-naphthol, tetrabromonaphthol, 8-oxyquinoline, phenyl-mercury-8-oxyquinoline.

Quaternary ammonium compounds having antimicrobic action are well known and are summarized in Schwartz et al., Surface Active Agents and Detergents, vol. II, 1958, pp. 205 to 225. Examples of said quaternary ammonium compounds are dilower alkyl higher alkyl benzyl ammonium halides such as dimethyl dodecyl benzyl ammonium chloride, diethyl dodecyl benzyl ammonium chloride, Benzalkon B (dimethyl higher alkyl dichlorobenzyl ammonium chloride), dimethyl octadecyl dimethylbenzyl ammonium chloride, etc.; dilower alkyl dihigher alkyl ammonium halides and trilower alkyl higher alkyl ammonium halides such as dimethyl didecyl ammonium chloride, dimethyl didodecyl ammonium chloride, trimethyl tetradecyl ammonium chloride, methyl diethyl decyloxyethyl ammonium bromide, etc.; N-trimethyl-N-chloro-N'-benzyl-N'-dodecyl-glycinamide, N-higher alkyl heterocyclics such as cetylpyridinium chloride, 2-tridecylpyridinium sulfate, 1-hexadecyl-pyridinium chloride, 2-dodecyl-isoquinolinium bromide, 2-octyl - 1 - (2-hydroxyethyl)-imidazolinium chloride, 6-dodecyloxybenzyl quinolinium chloride, benzyldecylpiperidinium chloride.

These synergistic antimicrobic compositions have the advantage that a lower degree of concentration of the phenolic or quaternary ammonium salts may be used so that there are not adverse effects therefrom in those cases where it is important. Moreover, the low activity of the quaternary ammonium compounds and certain bis-phenols to gram-negative bacteria is usually improved. They may be used for all the purposes for which antimicrobic compositions are normally used such as antiseptic cleansing agents for hands, textiles, floors, hospital equipment and instruments; antiseptic hair washing agents; antimicrobic ointments; liniments; powders; detergents and disinfectants for industrial plants such as dairies, breweries and laundries, etc.

In the following examples there are described several preferred embodiments to illustrate the invention. However, it should be understood that the invention is not intended to be limited to the specific embodiments.

EXAMPLE I 208 gm. (1 mole) of 1-nitro-3,3,3-trichloro-propanol-(2) were dissolved in 250 cc. of ethanol and the resulting solution was admixed with a solution of 23.0 gm. of sodium and 500 cc. of ethanol with stirring while the temperature was kept below 5° C. The precipitated sodium salt was separated and dried in vacuo to obtain 98.5% yield.

210 gm. (0.91 mole) of the said sodium salt were suspended in 500 cc. of ether and 145.5 gm. (0.91 mole or 49.5 cc.) of bromine was added thereto with stirring. The reaction product obtained was filtered from the precipitated sodium bromide and after the ether was distilled off in vacuo 247.6 gm. of raw product remained, which after distillation in vacuo gave 227.5 gm. (79% yield) of 1-bromo-1-nitro-3,3,3-trichloro-propanol-(2), having a boiling point of 136–137° C. at 12 mm. Hg.

EXAMPLE II—ANTIMICROBIC ACTIVITY

The threshold concentrations of the nitro aliphatic alcohols and combinations thereof with phenolic compounds were determined by the so-called plate test. This variation of the dilution test for chemical disinfectants set up by Deutsche Gesellschaft fur Hygene und Mikrobiologie has the advantage of using a solid culture media instead of a liquid culture media. Solid culture media have the advantage of being able to easily discover the effectiveness, particularly for fungicides.

The desired test concentrations were prepared by mixing specific amounts of the substance solutions of suitable concentrations with specific amounts of liquid bouillon or beer wort agars, in sterile Petri-dishes. The amounts, measured with a pipette, of the substance solutions were a maximum of 0.1 to 1 ml., the total volume in the Petri-dishes after admixing with the culture media amounted to 10 ml. After the solidification of the culture media, its surface was inoculated with the test germ suspension in bouillon or wort, which contained about $10^8$ germs per ml. The incubation took place at 37° C., or at 30° C. in the incubator, and lasted 8 days when bacteria or Candida albicans were employed. When epidermophyton Kaufmann-Wolf was used, it lasted 21 days. The duration of incubation of 21 days for epidermophyton Kaufmann-Wolf was chosen to conform to the above standard test, because in the evaluation of disinfectants against fungi of the epithelium a substance is considered as suitable when the growth of the fungi after predetermined duration of action is delayed by at least 21 days. Therefore, it was ascertained which of the substance concentrations worked into the culture media was just about capable to arrest the growth of the test germs completely. This value thus ascertained was indicated as threshold concentration. The tests were carried out in the following concentration intervals: 10,000, 5,000, 2,500, 1,000, 750, 500, 250, 100, 50, 25, 10, 5, 2.5, 1, 0.5, 0.25 and 0.1 p.p.m.

On the tests, the threshold concentration of the nitro alcohols and the phenolic compounds were first determined and then the threshold concentration of the nitro alcohol with the phenolic compound. The results of the tests are shown in Table I.

TABLE I

| Test germ | Antimicrobic agent | Threshold concentration of antimicrobic agent, p.p.m. | Potentiating agent | Threshold concentration of potentiating agent, p.p.m. | Antimicrobic agent and potentiating agent, p.p.m. | Ratio of antimicrobic agent to potentiating agent |
|---|---|---|---|---|---|---|
| Sta. aureus | A | 500 | G | 2,500 | 250 A plus 1,000 G | 1:4 |
|  |  |  | H | 100 | 250 A plus 50 H | 5:1 |
|  |  |  | K | 100 | 250 A plus 50 K | 5:1 |
|  |  |  | M | 100 | 250 A plus 50 M | 5:1 |
|  |  |  | P | 10 | 100 A plus 5 P | 20:1 |
|  | B | 10 | K | 100 | 5 B plus 50 K | 1:10 |
|  |  |  | O | 100 | 2.5 B plus 50 O | 1:20 |
|  | C | 2.5 | L | 10 | 1 C plus 5 L | 1:5 |
|  | D | 1 | I | 100 | 0.25 D plus 25 I | 1:100 |
|  | E | 5 | L | 10 | 1 E plus 5 L | 1:5 |
|  | F | 5 | L | 10 | 0.5 F plus 5 L | 1:10 |
| E. coli | A | 500 | O | 100 | 100 A plus 50 O | 2:1 |
|  |  |  | P | 10 | 250 A plus 5 P | 50:1 |
|  | B | 500 | L | 10 | 100 B plus 5 L | 20:1 |
|  |  |  | N | 100 | 100 B plus 50 N | 2:1 |
|  | C | 25 | L | 10 | 5 C plus 5 L | 1:1 |
|  | F | 500 | K | 50 | 250 F plus 25 K | 10:1 |
|  |  | 500 | M | 100 | 250 F plus 25 M | 10:1 |
| Ps. aeruginosa | D | 100 | K | 100 | 10 D plus 50 K | 1:5 |

The phenolic compounds in Table I are: (A) xylenol, (B) sodium pentachlorophenolate, (C) phenyl mercury 8-oxyquinoline, (D) hexachlorophene or 2,2'-methylene-bis-trichlorophenol. The quaternary ammonium compounds in Table I are: (E) cetylpyridinium chloride and (F) Benzalkon B or dichlorobenzyl dimethyl alkyl ammonium chloride.

The synergistic agents used in Table 1 are:

(G) 2-ethyl-2-nitro-propanediol-(1,3),
(H) 2-hydroxymethyl-2-nitropropanediol-(1,3),
(I) 2-bromo-2-nitro-propanol-(1),
(K) 2-bromo-2-nitropropanediol-(1,3),
(L) 1-bromo-1-nitro-3,3,3-trichloro-propanol-(2),
(M) 2-bromo-2-nitro-1-phenyl-propanediol-(1,3),
(N) 2-bromo-2-nitro-1-(p-nitrophenyl)-propanediol-(1,3),
(O) 2-bromo-2-nitro-1-(o-chlorophenyl)-propanediol-(1,3) and
(P) 2-bromo-2-nitro-butanol-(1).

ANTIMICROBIC COMPOSITIONS

Antimicrobic powder

| | Parts by weight |
|---|---|
| Hexachlorophene | 0.5 |
| 2-bromo-2-nitro-propanediol-(1,3) | 0.5 |
| Powdered talc | ad 100 |

ANTIMICROBIC COMPOSITIONS—Continued

Antimicrobic ointments

A:                                                  Parts by weight
  Hexachlorophene ............................... 0.5
  1-bromo-1-nitro - 3,3,3 - trichloro-propanol-
    (2) ........................................... 0.1
  Vaseline ....................................... ad 100
B:
  tribromo-salicylanilide ........................ 0.4
  2-bromo-2-nitro-1-(o-chlorophenyl)-propane-
    diol-(1,3) ..................................... 1.0
  Polyethyleneglycol 300+polyethylene-glycol
    1500 1:1 ..................................... ad 100
C:
  8-oxyquinoline ................................. 0.5
  2-bromo-2-nitro-butanol-(1) .................... 0.5
  decyl ester of oleic acid ...................... 15
  Mixture of 90 T, $C_{16}$-$C_{18}$-alcohol and 10 T
    sodium-$C_{16}C_{18}$-alcohol sulfate ........ 24
  Water .......................................... 60

Deodorant spray 2-octyl-dodecanol ................................ 10
Hexachlorophene .................................. 0.5
2-hydroxymethyl-2-nitro-propane-diol-(1,3) ....... 1.5
Perfume .......................................... 1
Ethanol .......................................... 87
Propellant gas ................................... 100

Deodorant pencil

Stearyl alcohol .................................. 10
2-octyldodecanol ................................. 10
Monoethanolamide of coconut fatty acid ........... 10
Monoethanolamide of stearic acid ................. 15
Carnauba wax ..................................... 2
Paraffin (72° C.) ................................ 11
Scented oil ...................................... 2
1,2-propyleneglycol .............................. 38
Hexachlorophene .................................. 1
1-bromo-1-nitro-3,3,3-trichloro-propanol-(2) ..... 1

Disinfectant hand washing paste

Sodium laurylsulfate ............................. 52
Monoethanolamide of coconut fatty acid ........... 3
Finely ground pumice ............................. 41
Hexachlorophene .................................. 2
1-bromo-1-nitro-3,3,3-trichloro-propanol-(2) ..... 2

Animicrobic fine wash detergent

Dodecyl benzene sulfonate ........................ 30
Toluene sulfonate ................................ 2
Sodium coconut fatty alcohol-sulfate ............. 8
Sodium sulfate ................................... 30
Sodium carboxy methylcellulose ................... 1
2,2'-methylene-bis-trichlorophenol ............... 2
2-bromo-2-nitro-butanol-(1) ...................... 2
Water ............................................ 25

ANTIMICROBIC COMPOSITIONS—Continued

Antiseptic clear shampoo

A:                                                  Parts by weight
  Sodium lauryl ether sulfate (27–27% WAS) ....... 40
  Coconut fatty acid diethanolamide .............. 6
  Hexachlorophene ................................ 2
  2-bromo-2-nitro-propanediol-(1,3) .............. 2
  Water .......................................... 50

Various modifications of the invention may be made without departing from the spirit or scope thereof and it is to be understood that the invention is to be limited only as defined in the appended claims.

We claim:

1. A synergistic antibacterial and antifungal composition comprising (A) an antibacterial and antifungal compound selected from the group consisting of a phenolic compound and a quaternary ammonium compound having at least one hydrophobic radical of 8 to 18 carbon atoms and (B) a straight chain aliphatic alcohol of 2 to 5 carbon atoms having at least one nitro group and which may be substituted with a radical selected from the group consisting of bromine, chlorine, lower alkyl, hydroxy lower alkyl, phenyl, chlorophenyl and nitrophenyl, the weight ratio of compound to alcohol being 100:1 to 1:50.

2. The composition of claim 1 wherein the alcohol is substituted with a member selected from the group consisting of bromine and chlorine.

3. The composition of claim 1 wherein the alcohol is substituted with a member selected from the group consisting of lower alkyl and hydroxy lower alkyl.

4. The composition of claim 1 wherein the alcohol is substituted with a member selected from the group consisting of phenyl, chlorophenyl and nitrophenyl.

5. The composition of claim 1 wherein the alcohol is 1-bromo-1-nitro-3,3,3-trichloro-propanol-(2).

6. A method of killing fungi and bacteria which comprises applying to said bacteria and fungi an effective amount of the composition of claim 1.

7. The method of claim 6 wherein the alcohol is 1-bromo-1-nitro-3,3,3-trichloro-propanol(2).

References Cited

UNITED STATES PATENTS 2,931,839   4/1960   Kundiger et al. .......... 260—633

FOREIGN REFERENCES 1,057,131   2/1967   Great Britain ........... 424—343

ALBERT T. MEYERS, Primary Examiner

V. D. TURNER, Assistant Examiner

U.S. Cl. X.R.

424—343, 346